US006779105B1

(12) United States Patent
Bouyoux et al.

(10) Patent No.: US 6,779,105 B1
(45) Date of Patent: Aug. 17, 2004

(54) TWO PIPELINE STAGE MICROPROCESSOR AND METHOD FOR PROCESSING AN INSTRUCTION

(75) Inventors: Eric Bouyoux, Bouc Bel Air (FR); Bruno Charrat, Aix en Provence (FR); Nicolas Pangaud, Aix en Provence (FR); Sean Commercial, Aix en Provence (FR)

(73) Assignee: Inside Technologies, Saint Clement les Places (FR)

( * ) Notice: Subject to any disclaimer, the term of this patent is extended or adjusted under 35 U.S.C. 154(b) by 0 days.

(21) Appl. No.: 09/564,098

(22) Filed: May 3, 2000

Related U.S. Application Data

(63) Continuation of application No. PCT/FR98/02267, filed on Oct. 23, 1998.

(30) Foreign Application Priority Data

Nov. 3, 1997 (FR) .............................................. 97 13759

(51) Int. Cl.[7] .............................................. G06F 9/38
(52) U.S. Cl. ...................................... 712/219; 712/220
(58) Field of Search ................................. 712/220, 219, 712/245

(56) References Cited

U.S. PATENT DOCUMENTS

| | | | | |
|---|---|---|---|---|
| 4,399,507 A | * | 8/1983 | Cosgrove et al. | ............ 712/219 |
| 4,750,112 A | * | 6/1988 | Jones et al. | .................. 712/217 |
| 4,802,113 A | * | 1/1989 | Onishi et al. | ................ 712/233 |
| 4,943,915 A | * | 7/1990 | Wilhelm et al. | ............... 712/34 |
| 6,108,773 A | * | 8/2000 | Col et al. | ..................... 712/237 |

FOREIGN PATENT DOCUMENTS

| | | |
|---|---|---|
| EP | 0 378 816 A2 | 7/1990 |
| EP | 0 438 126 A2 | 7/1991 |

OTHER PUBLICATIONS

Norman P. Jouppi, "The Nonuniform Distribution of Instruction-Level And Machine Parallelism And Its Effect On Performance" *IEEE Transactions On Computers* vol. 38, No. 12 pp. 1645–1658, (Dec., 1989).

\* cited by examiner

Primary Examiner—Richard L. Ellis
(74) Attorney, Agent, or Firm—Akin Gump Strauss Hauer & Feld, LLP

(57) ABSTRACT

The present invention relates to a pipeline microprocessor (MP) comprising a first pipeline stage (ST1) comprising means IPC, MMU, PC, B2, DEC1) for reading and decoding instructions ($CODE_{OP}$, ADRs, ADRd) of a program recorded in a memory (MEM), and a second pipeline stage (ST2), contiguous to the first pipeline stage, comprising two sectors (ST21, ST22) activated one after the other during complementary half-cycles of a clock signal (H1) of the microprocessor. The first sector reads data contained in two registers (Rd, Rs) of a bank of registers (BANK1, BANK2) of the microprocessor and carries out an operation on the data according to an instruction ($CODE_{OP}$, ADRs, ADRd) received at the previous clock cycle. The second sector (ST22) comprises means (B4, DEC1) to record the result of the operation in a register of the bank of registers (BANK1, BANK2). Application especially to chip cards.

6 Claims, 3 Drawing Sheets

TWO PIPELINE STAGE MICROPROCESSOR AND METHOD FOR PROCESSING AN INSTRUCTION

CROSS REFERENCE TO RELATED APPLICATION

This Application is a continuation of International Application PCT/FR98/02267, filed Oct. 23, 1998, the disclosure of which is incorporated herein by reference.

BACKGROUND OF THE INVENTION

The present invention relates to a microprocessor designed especially but not solely to be integrated into a chip card, and more particularly into a contactless inductive type chip card.

Inductive contactless chip cards, supplied by electromagnetic induction, have to comply with contradictory technical constraints. First of all, their electrical- power resources are low and depend on the distance between the antenna coil and the supply coil of a card reader. This distance, which about a few centimeters, may vary greatly depending on the user's movements in such a way that the supply voltage received by induction may fluctuate greatly and become very low. Furthermore, contactless chip cards provide high operating speed ensuring fast processing of electronic transactions. For example, a chip card of the electronic badge type used for access control is presented to the user before a control terminal. The period of time during which the card is presented before the terminal must be short, about a few milliseconds. During this period, the card is electrically powered by induction and must carry out several operations such as the production and sending of an authentication code, the sending of an authentication number, possibly the recording in its memory of the "door opening request" event, date, place, etc.

Now, the increase in operating speed of an integrated circuit, especially a CMOS technology circuit, is associated with an increase in electrical power consumption. A contactless chip card microprocessor must therefore be fast while at the same time consuming little current.

It has been the practice hitherto, in chip cards with contacts, to use microprocessors of simple but old design. Their only advantage ultimately was that they cost little and were compact in terms of silicon surface area. With the appearance of contactless chip cards, these microprocessors are seen to be obsolete and incapable of meeting the above-mentioned constraints.

There also exist known sophisticated pipeline type microprocessors, namely microprocessors with overlapping of instructions. The advantage of these microprocessors is that they work at high speed. However, these microprocessors have a degree of complexity, space requirement and cost price that makes them unsuitable for integration into chip cards.

SUMMARY OF THE INVENTION

The goal the present invention is to provide for a microprocessor that, at the same time, is simple in design and compact and consumes little power, while providing high-speed processing of the instructions of a program.

To achieve this goal, the idea of the present invention is to make a pipeline type microprocessor in order to benefit from the advantages of the overlapping of instructions wherein the processing of the instructions of the program is done in a minimum number of pipeline cycles with the intervention of a minimum number of a pipeline stages in a simpler way so as to reduce the number of logic gates simultaneously activated and the electrical power consumption.

More particularly, the present invention provides for a pipeline microprocessor comprising a first pipeline stage comprising means for reading and decoding instructions of a program recorded in a memory, a second pipeline stage contiguous to the first pipeline stage, comprising two sectors activated one after the other during complementary half-cycles of a clock signal of the microprocessor, the first sector comprising means to read pieces of data contained in two registers of a bank of registers of the microprocessor and carry out an operation on the data according to an instruction received at the previous clock cycle by the first pipeline stage, the second sector comprising means to record the result of the operation in a register of the bank of registers.

According to one embodiment, the first pipeline stage comprises two sectors activated during the complementary half-cycles of the clock signal, the first sector of the first pipeline stage comprising means for reading the instructions in the memory, the second sector of the first pipeline stage comprising means for decoding the instructions.

According to one embodiment, the first sector of the second pipeline stage comprises an arithmetic and logic unit and a shift circuit.

According to one embodiment, the first sector of the second pipeline stage comprises means to carry out the concatenation of a bit of a first binary word with bits of a second binary word in one clock half-cycle.

According to one embodiment, the reading and decoding means are arranged to decode compact instructions comprising an instruction code, an address of a first register and an address of a second register of the bank of registers.

The present invention also relates to a pipeline microprocessor comprising means for reading and means for decoding instructions of a program recorded in a memory, a bank of registers and data computation and processing means in which the read means and the decoding means are laid out in a first pipeline stage, the computation and processing means are laid out in a first sector of a second pipeline stage contiguous to the first pipeline stage, the first sector being activated during a first half-cycle of a clock signal of the microprocessor, the bank of registers is laid out in read mode in the first sector of the second pipeline stage and in write mode in a second sector of the second pipeline stage, the second sector being activated during a second clock half-cycle.

According to one embodiment, the memory is laid out in write mode in the second sector of the second pipeline stage.

According to one embodiment, the computation and processing means comprise means for the performance, in one clock half-cycle, of an operation to concatenate a bit of a first binary word with bits of a second binary word.

The present invention also relates to a method for the processing of an instruction read in a memory by a microprocessor comprising a bank of registers, means for decoding the instruction and means for executing the instruction, comprising a first step for extracting a first address, a second address and an operation code contained in the instruction, with a maximum duration of one clock cycle of the microprocessor, a second step for the simultaneous reading of a first register and a second register of the bank of registers identified by the addresses extracted from the instruction during the first step and for carrying out, on the basis of the contents of the registers, an arithmetic or logic operation identified by the operation code of the instruction, with a duration of one clock half-cycle, and a third step for the recording of the result of the operation in a register of the bank of registers, with a duration of one clock half-cycle.

According to one embodiment, the result is recorded in one of the first and second registers.

BRIEF DESCRIPTION OF THE SEVERAL VIEWS OF THE DRAWINGS

These characteristics and advantages as well as others in the present invention shall be explained in greater detail in the following description of the general architecture and of an embodiment of the microprocessor according to the invention, given non-restrictively with reference to the appended figures, of which.

DETAILED DESCRIPTION OF THE INVENTION

General architecture of a microprocessor according to the invention

Figure 1:
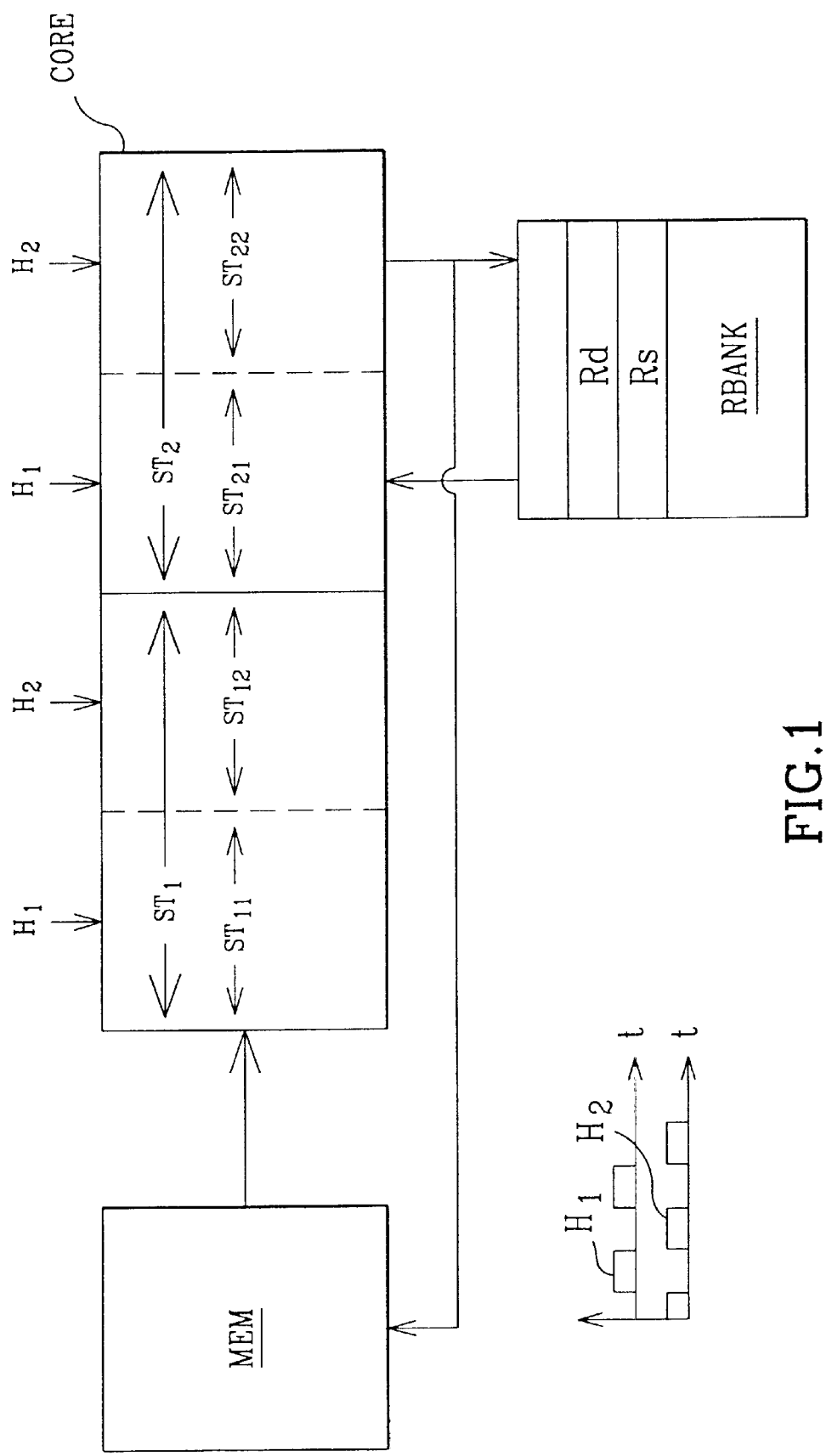
FIG. 1 provides a schematic view of the general architecture of a microprocessor according to the invention, FIG. 2 provides a more detailed view of an exemplary embodiment of the microprocessor of FIG. 1.

FIG. 1 shows the general architecture of a microprocessor MP according to the invention. The microprocessor is of the pipeline type and works by overlapping of instructions. The microprocessor is laid out to execute compact instructions that herein are in the following format:

| $CODE_{OP}$ | ADRd | ADRs | — |
|---|---|---|---|

These instructions, encoded herein on 16 bits, comprise a code $CODE_{OP}$ of the operation OP to be executed, encoded on 4 bits, the address ADRd of a destination register Rd for the result, on 4 bits, and the address ADRs of a source register Rs on 4 bits (herein, the last field of the instruction is not used). The operation is for example the addition ADD (add Rs and Rd and store the result in Rd), the subtraction SUB (subtract Rs from Rd and store the result in Rd), the logic OR (store the result of Rs OR Rd in Rd), the logic AND, etc.

The microprocessor conventionally has a core CORE, a bank of registers RBANK, and a program memory MEM. According to the invention, the core CORE comprises a stage ST1 for the reading and decoding of the instructions of the program stored in the memory MEM and a stage ST2 for the performance of these instructions. Each stage is divided into two sectors ST11/ST12, and ST21/ST22 respectively, working alternately. The sector ST11 is assigned to the reading ("fetch" cycle) of the instructions and the sector ST12 to the decoding of the instructions. The sector ST21 is assigned to the reading of registers known as the "source" register Rs and the "destination" register Rd in the bank RBANK and to the execution of the operation designated by the code $CODE_{OP}$ of the instructions. The sector ST22 is assigned to the registration of the result in the destination register Rd or in the memory MEM.

The first sectors ST11, ST21 of each stage are activated by the clock signal Hi of the microprocessor and the second sectors ST21, ST22 are activated by a signal H2 phase-shifted by 180°. To give a clearer picture, the signals H1, H2 are shown in FIG. 1. Thus, each pipeline stage ST1, ST2 works in one clock cycle H1 and each sector works in one clock half-cycle. The operation of the microprocessor is illustrated by the following Table 1 which describes a processing sequence of two successive operations. Table 1

TABLE 1

| Pipeline Cycle | | Pipeline Cycle | | Pipeline Cycle | |
|---|---|---|---|---|---|
| ½ cycle | ½ cycle | ½ cycle | ½ cycle | ½ cycle | ½ cycle |
| H1 = 1 | H2 = 1 | H1 = 1 | H2 = 1 | H1 = 1 | H2 = 1 |
| step 1.1 | step 1.2 | step 1.3 | step 1.4 | | |
| | | step 2.1 | step 2.2 | step 2.3 | step 2.4 |

The first instruction is processed in four steps 1.1 to 1.4 and the second instruction in four steps 2.1 to 2.4. The steps 1.1, 2.1 are steps for reading instructions and are executed in the sector ST11. The steps 1.2, 2.2 are steps for decoding the instructions and are executed in the sector ST12. The steps 1.3, 2.3 executed in the sector ST21 are steps for reading the registers Rd, Rs and for carrying out an operation on the contents of these registers, in accordance with the code $CODE_{OP}$ of the instruction. Finally, the steps 1.4, 2.4 are steps for recording the result in the register Rd, executed in the sector ST21.

Thus, the instructions are executed in one pipeline clock cycle when the pipeline chain is initiated. The sectors ST11, ST21 are active simultaneously, then the sectors ST12, ST22. This microprocessor architecture therefore has the advantage of being fast. It is also simple to implement and has limited space requirement, as shall be seen here below.

Exemplary embodiment of a microprocessor according to the invention

Figure 2:
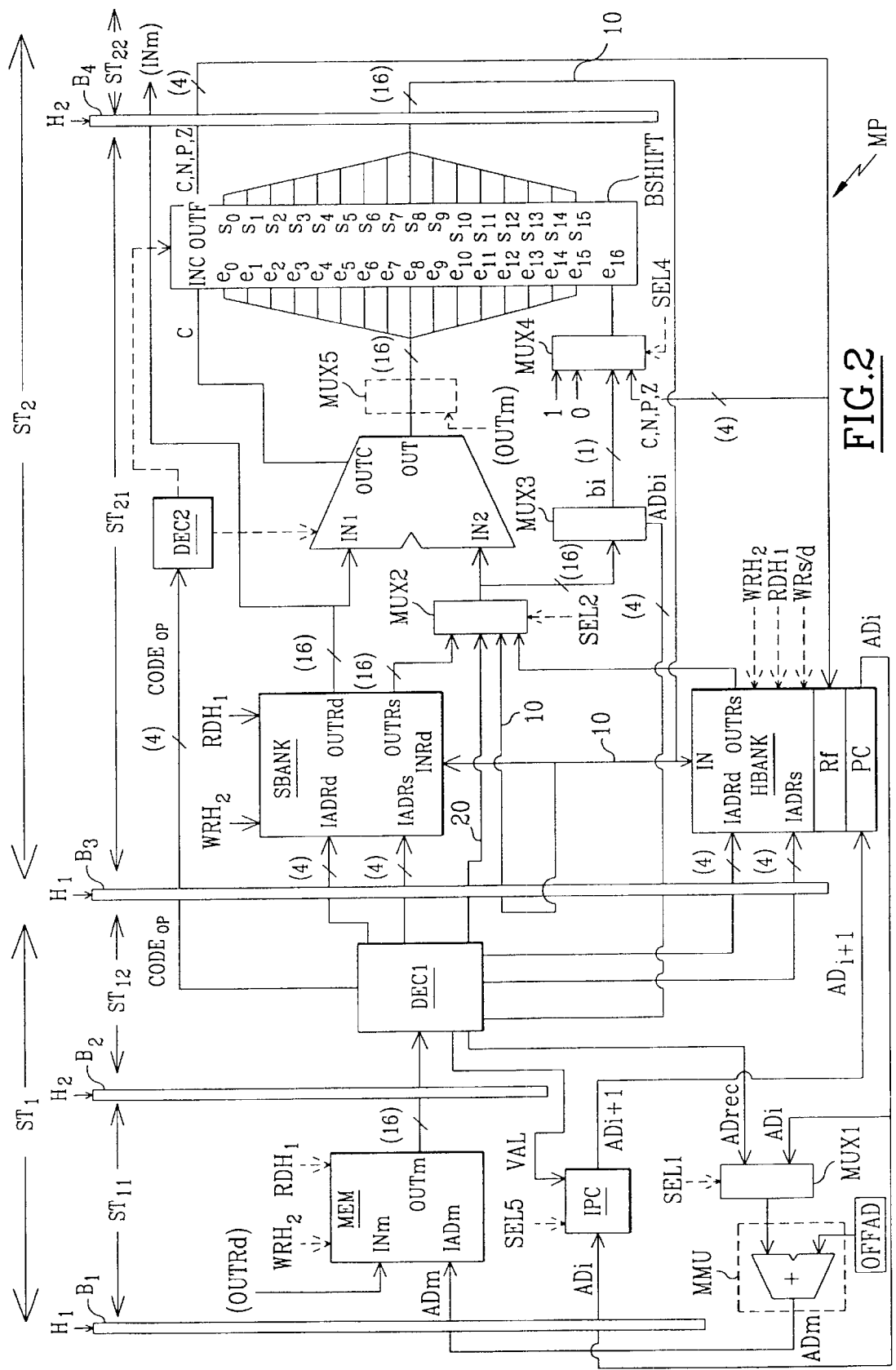

FIG. 2 shows an exemplary embodiment of the microprocessor MP. In this figure, the pipeline stages ST1, ST2 are demarcated by registers B1, B3. The register B1 is for example a tristate buffer that is transparent when the clock signal H1 is at 1. The register B3 is for example a latch register activated by the passage to 1 of the clock signal H1. The sectors ST11, ST12 of the stage ST1 are demarcated by a register B2, for example a latch register, activated by the passage to 1 of the signal H2. The sectors ST21, S22 are demarcated by a register B4, for example a tristate buffer that is transparent when the signal H2 is at 1. Thus, the clock signal H1 synchronizes the transfer of the pieces of data from the stage ST1 to the stage ST2 and the phase-shifted signal H2 synchronizes the transfer of pieces of data from the first sector ST11, ST21 to the second sector ST12, ST22 of each pipeline stage.

The core of the microprocessor, as shown, essentially comprises a decoder DECO, an arithmetic and logic computation unit ALU and a shift circuit BSHIFT. The decoder DECO is laid out in the sector ST12 while the unit ALU and the circuit BSHIFT are laid out in the sector ST21. Furthermore, it is possible to distinguish the program memory MEM already described as well as a bank of registers which herein take the form of a bank SBANK of software registers and a bank HBANK of hardware registers. With a view to simplifying the figure, the memory MEM and the banks of registers are shown within pipeline stages ST1, ST2 of the microprocessor and are therefore mixed with the elements of the core.

The decoder DEC1 sees to the decoding of the instructions contained in the memory and the sequencing of the internal steps for processing these instructions. To this end, the decoder is connected to an output OUTm for reading the memory MEM by means of the register B2, to receive a new instruction to be processed at each clock cycle.

The bank SBANK contains various working registers, for example sixteen registers R0 to R15 (not shown). The bank SBANK comprises an input IADRs to receive the address ADRs of the source register Rs and an input IADRd to receive the address of the destination register Rd. The bank SBANK also has an output OUTRs for reading the source register Rs, an output OUTRd for reading the destination register Rd and an input INRd for the writing of a result in the destination register Rd.

The bank HBANK has several standard type status registers pertaining to the microprocessor, for example a status register RS, a stack pointer register SP, etc. These registers are not shown except for a flags register Rf and a program counter register PC. The register Rf conventionally has flags C, N, P, Z of the microprocessor, namely the sum carry flag C, sign flag N, parity flag P and the zero value flag Z. The register PC which is a program counter or ordinal counter, contains the compact address ADi of an instruction to be read in the memory MEM and is incremented at each new clock cycle by a circuit IPC which shall be described further below.

Like the bank SBANK, the bank HBANK is accessible in read and write mode from the data path of the microprocessor. The bank thus comprises inputs IADRs, IADRd, an output OUTRs and an input IN for the writing of a result in the register Rd or Rs selected by means of a signal WRs/d delivered by the decoder DEC1.

The inputs IADRs, IADRd of the banks SBANK, HBANK receive, by means of the decoder DEC1, the addresses ADRs, ADRd contained in the compact instructions whose general format has been described further above. As a general rule, the decoder DEC1 sends the addresses ADRs, ADRd to only one of the two banks, chosen as a function of the code $CODE_{OP}$ of the received instruction. However, one of the two addresses ADRs, ADRd may be sent to the bank SBANK and the other to the bank HBANK.

The memory MEM has a data input INm connected to the output OUTRd of the bank SBANK by means of the registers B4, B1. Furthermore, the memory MEM, at an address input IADm, by means of the buffer B1, receives extended 32-bit addresses ADm delivered by a memory management unit MMU or address converter. This unit MMU itself, at input, receives the compact 16-bit address ADi present in the register PC or a compact address ADrec delivered by the decoder DEC1. The selection of the address ADi or of the address ADrec at the input of the unit MMU is done by a multiplexer MUX1 driven by a signal SEL1. The working of the unit MMU and of the multiplexer MUX1 shall be described further below.

The memory MEM and the bank of registers SBANK, HBANK are controlled in read mode by a signal RDH1 and in write mode by a signal WRH2. These signals are sent by the decoder DEC1. The read signal RDH1 is sent when the clock signal H1 goes to 1 and the write signal WRH2 is sent when the signal H2 goes to 1. The banks SBANK, HBANK thus belong in read mode to the first sector ST21 of the stage ST2 and in write mode to the second sector ST22 of the stage ST2. Also, the memory MEM belongs in read mode (output OUTm) to the sector ST11 of the stage ST1 and in write mode (input INm) to the sector ST22 of the stage ST2.

The unit ALU herein has two inputs IN1, IN2, a result output OUT and an output OUTC delivering the carry flag C. The input IN1 is connected to the output OUTRd of the bank SBANK. The input IN2 is connected to the output of a multiplexer MUX2 driven by a signal SEL2, receiving, at two of its inputs, the output OUTRs from the bank SBANK and the output OUTRs from the bank HBANK. The output of the multiplexer MUX2 is furthermore connected to the input of a multiplexer MUX3 of the 16/1 type, whose role is to select a bit $b_i$ out of 16 bits received at input. The multiplexer MUX3 is driven by a signal ADBi encoded on four bits, representing the address or rank of the bit to be selected, delivered by the decoder DEC1 upon reception of a special instruction that shall be described further below.

The circuit BSHIFT has sixteen bit inputs $e_0$ to $e_{15}$ connected to the output OUT of the unit ALU, an auxiliary input $e_{16}$ and sixteen bit outputs $s_0$ to $s_{15}$. The auxiliary $e_{16}$ receives the output of a multiplexer MUX4 driven by a signal SEL4. The multiplexer MUX4 receives, at input, a value 0 bit, a value 1 bit, the flags C, N, P, Z from the microprocessor and the output (bit $b_i$) from the multiplexer MUX3. The outputs $s_0$ to $s_{15}$ are transferred by means of the register B4 to the sector ST22 to form a bus 10 terminating the data path of the microprocessor. The bus 10 is sent to the input INRd of the bank SBANK and to the input IN of the bank HBANK. The bus 10 is also connected by means of the register B3 to a third input of the multiplexer MUX2.

The circuit BSHIFT can be inhibited or active. In the inhibited state, the circuit BSHIFT is transparent and the outputs $s_{15}$ to $s_0$ copy the inputs $e_{15}$ to $e_0$. In the active state, the circuit BSHIFT shifts its outputs in relation to its inputs. The outputs $s_{14}$ to $s_0$ copy the inputs $e_{15}$ to $e_1$ respectively and the output $s_{15}$ copies the auxiliary input $e_{16}$. The input $e_0$ in this case is disconnected from the data path.

The circuit BSHIFT also has an output OUTF delivering the four flags C, N, P, Z of the microprocessor after each operation performed. To this end, the bit C delivered by the unit ALU is applied to an input INC of the circuit BSHIFT. The output OUTF copies the bit C delivered by the unit ALU when the circuit BSHIFT is transparent. When the circuit BSHIFT shifts its outputs, the bit C delivered by the output OUTF is the bit present at the input $e_0$. The output OUTF is sent by means of the register B4 to the input of the register RF of the bank HBANK for the storage of the flags, and to the input of the multiplexer MUX4, for the possible injection of a flag into the data path.

The unit ALU and the circuit BSHIFT are driven by a decoder DEC2 receiving, from the decoder DECO, the code $CODE_{OP}$ of the operation to be executed (when the instruction received pertains to an arithmetic or logic operation). This code is transferred to the decoder DEC2 by means of the register B3 for the accurate synchronization of the pipeline stages.

Finally, it can be seen from the above that the result of an operation performed in the sector ST21 may be registered in the instruction received:

(i)— in the destination register Rd of the bank SBANK whose address ADRd is given by the instruction, (ii)— in one of the registers Rs, Rd of the bank HBANK, whose addresses are given by the instruction, the selection being done by means of the signal WRs/d.

The case (i) is the more general one and corresponds to the execution of arithmetic or logic instructions, examples of which are given here below. The case (ii) enables the handling of the hardware registers and shall not be described here below with a view to simplicity. It is up to those skilled in the art to plan for instructions other than those that have been described here below as examples, in order to exploit all the possibilities offered by the microprocessor according to the invention.

The result of an operation may also be reinjected into the data path by means of the multiplexer MUX 2. Finally, the contents of a register of the bank SBANK may be registered in the memory MEM, as shall be seen further below.

As shall be seen clearly to those skilled in the art, the microprocessor according to the invention is of a particularly simple structure that ensures low current consumption. An additional step to limit electrical power consumption consists of the placing, at the outputs OUTRs, OUTRd of the banks HBANK, SBANK, of buffer registers driven by a signal H1' offset by a duration t with respect to the signal H1. Thus, the unit ALU is connected to the outputs OUTRs, OUTRd only when they are stabilized. The offset signal H1' may be obtained simply by means of a delay circuit, for example cascade-connected inverter gates.

A description shall now be given of certain instructions, chosen as examples, to illustrate the working of the microprocessor.

Execution of Arithmetic or Logic Type Instructions

The general format of these instructions has already been descried further above. Reference shall be made for example to the following sequence of instructions:

(1) SUB R1, R2 (subtract R2 from R1 and store the result in R1).
(2) OR R0, R1 (perform the logic OR operation bit by bit of R0 and R1 and store the result in R0).

These instructions are delivered by the memory MEM in the following form:

| $CODE_{SUB}$ | ADR1 | ADR2 | — |
| $CODE_{OR}$ | ADR0 | ADR1 | — |

The sequence is executed by the microprocessor according to the steps 1.1 to 1.4 and 2.1 to 2.4 described here below which overlap as indicated in the Table 1 given further above. The various operations performed during each of these steps run asynchronously according to the flow of data through the elements of the microprocessor, and are considered to be completed at the end of each step.

1.1—The reading of the instruction "SUB R1,R2" (H1=1, H2=0, transparent buffer B1, sector ST11 active). Here, the decoder DEC1 sends the signal RDH1 and the instruction is read in the memory MEM.

1.2—The decoding of the instruction (H1=0, H2=1, register B2 activated, sector ST12 active) . Here, the decoder DEC1 decodes the instruction, positions the signal SEL2 for the control of the multiplexer MUX2, sends the addresses ADR1, ADR2 to the bank SBANK and the operation code $CODE_{SUB}$ of the subtraction to the decoder DEC2.

1.3—The reading of the registers and the execution of the instruction (H1=1, H2=0, register B3 activated, sector ST21 active). The bank SBANK receives the addresses ADR1, ADR2, the decoder DEC2 receives the code CODESUB and the decoder DEC1 sends the read signal RDH1. The registers R1, R2 are read and their contents are applied to the inputs IN1, IN2 of the unit ALU which delivers the result of the subtraction [R1–R2 ].

1.4—The recording of the result (H1=0, H2=1, register B4 transparent, sector ST22 active). The decoder DEC1 applies the write signal WRH2 to the bank SBANK. The circuit BSHIFT is transparent, the result of the subtraction [R1–R2 ] is retrieved at the input INRd of the bank SBANK and is registered in the register R1.

2.1—The reading of the instruction "OR R0,R1". This step is identical to the step 1.1.

2.2—The decoding of the instruction. This step is identical to the step 1.2.

2.3—The execution of the instruction. This step is identical to the step 1.3. The source and destination registers are now R1, R0 and the unit ALU is configured by the decoder DEC2 to perform the bit-by-bit logic OR operation of the words contained in these registers.

2.4—The recording of the result. This step is identical to the step 1.4, the destination register of the result being kept in the register R0.

Naturally, other arithmetic or logic instructions may be implemented. For example, operations such as division or multiplication that conventionally require various shifts of bits may be done by means of the shift circuit BSHIFT. This circuit is designed, in a single operation, to perform a leftward shift or rightward shift by several ranks of bits. Furthermore, it can be seen that the input $e_{16}$ of the circuit BSHIFT and the multiplexer MUX4 enable the injection, into the result, of a flag C, P, N, Z of the previous result or a predetermined value at 1 or 0. Furthermore, since the bus 10 is sent to an input of the multiplexer MUX2, repetitive operations may be sequenced without any need to register an intermediate result at each step in the destination register.

Figure 3:
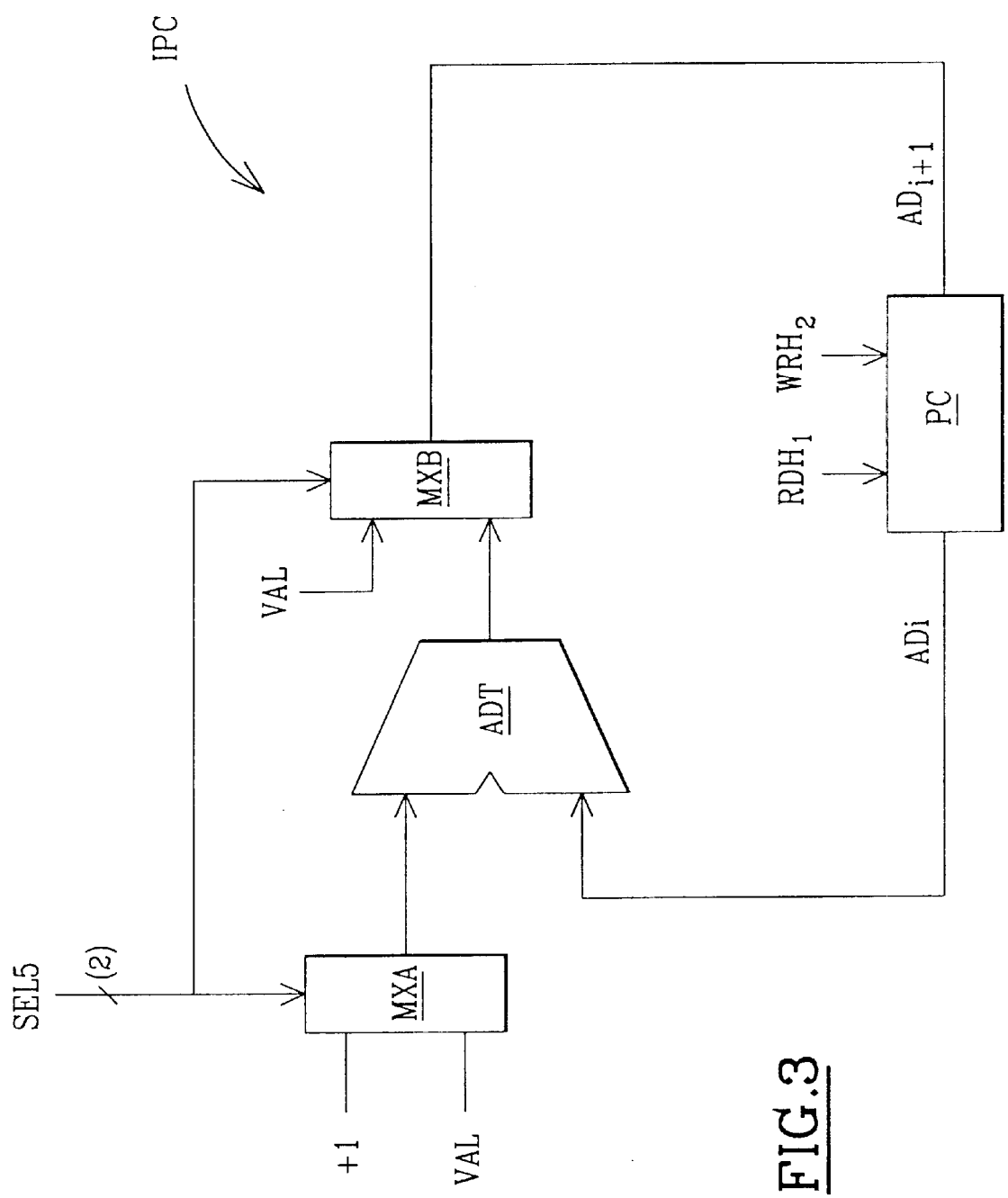
FIG. 3 shows the structure of a circuit shown in block form in FIG. 2.

Incrementation of the Program Counter and Execution of the Jump or Call Instructions FIG. 3 gives a more detailed view of the circuit IPC for the incrementation of the register PC, or program counter. The circuit IPC comprises an adder ADT and two multiplexers MXA, MXB. The multiplexer MXA receives a value 1 bit at input, herein representing the normal value of incrementation of the register PC, and an address VAL on 16 bits. The adder ADT receives, at its inputs, the current address $AD_i$ contained in the register PC and the output of the multiplexer MXA. The output of the adder ADT is applied to the input of the multiplexer MXB whose other input receives the value VAL. The output of the multiplexer MXB delivers an address $AD_{i+1}$ to the input of the register PC. The multiplexers MXA, MXB are driven by a three-state selection signal SEL 5 delivered by the decoder DEC1.

Thus, the address $AD_{i+1}$ delivered by the circuit IPC may be equal to $AD_{i+1}$ (increment by one unit), $AD_{i+}VAL$ (jump of program counter), or VAL (program counter call operation) . The increment by one unit corresponds here to the normal incrementing of the program counter. The jump in value or the call operation is performed when the decoder DEC1 receives JMP (jump) type instructions or CALL (call) type instructions which may be planned in the following sequence:

| $CODE_{JMP}$ | — | — | VAL |
| $CODE_{CALL}$ | — | — | VAL |

At each activation of the sector ST11, the current address $AD_i$ is read in the register PC by application of the signal RDH1. The new address $AD_{i+1}$ delivered by the circuit IPC is recorded in the register PC by the application of the signal WRH2 when the sector ST12 is active. To facilitate the synchronizing of these operations, it is possible to transfer a part of the functions of the decoder DEC1 to the sector ST11, for example in the form of a predecoding circuit so that the JMP or CALL type instructions are predecoded in the sector ST11.

As already indicated, the current address $AD_i$ is encoded in 16 bits and is applied to the unit MMU which converts it into the format of the addresses of the memory MEM, for example a 32-bit format. The unit MMU converts the address $AD_i$ conventionally, by concatenation or addition, with a 32-bit offset address OFFAD. In FIG. 2, the unit MMU is an adder receiving the address $AD_i$ and the address OFFAD at input. The offset address may be stored in a register of the bank HBANK so that it can be modified dynamically during the execution of a program.

Execution of an Instruction for Loading a Result into the Memory

By switching the multiplexer MUX1 by means of the signal SEL1, the decoder DEC1 can furthermore route an address Adrec, delivered by the decoder DEC1, to the input of the unit MMU. This address is extracted from a loading instruction REC which may be planned in the following format:

| $CODE_{REC}$ | ADRs | Adrec |
| --- | --- | --- |

This instruction designates a register Rs in one of the banks SBANK, HBANK, the contents of which must be registered in the memory MEM at the logic address ADrec. The distinction between the banks SBANK, HBANK is made by the code CODEREC which may assume several values. The instruction REC is read and decoded in a clock cycle in the stage ST1, and then executed in a clock cycle in the stage ST2. More particularly, the register Rs is read during the activation of the sector ST21 and its contents are registered in the memory (input INm) during the activation of the sector ST22. In this particular case, the pipeline operation has to be temporarily interrupted. Indeed, the memory cannot simultaneously register a value present in the sector ST22 and read a new instruction in the sector ST11. In one approach enabling the non-interruption of the pipeline chain, there is provided a data memory that is distinct from the program memory and belongs exclusively to the read and write stage ST1.

Be that as it may, it can be seen that the priority is given to the execution, in the stage ST2, of fully looped operations bringing into play the registers of the microprocessor. This characteristic is an aspect of the invention that makes it possible to obtain high-speed processing of instructions with a particularly simple and compact microprocessor. Furthermore, this characteristic is particularly well suited to programs loaded in chip cards, which comprise sequences of repetitive operations before the loading of a result in the memory.

Among these repetitive operations, there is especially the bit concatenation operation which comes into work in the performance of cryptography algorithms enabling the generation of the authentication codes for the chip cards. This operation shall now be described.

Execution of a Special Bit Concatenation Operation

Advantageously, the microprocessor is also organized to execute a concatenation instruction BMV for example according to the following format:

| $CODE_{BMV}$ | ADRd | ADRs | ADbi |
| --- | --- | --- | --- |

This instruction comprises the code CODEBMV of the concatenation operation, on 4 bits, the address ADRd of the destination register Rd of the result of the concatenation, on 4 bits, the address ADRs of a source register Rs, on 4 bits, and the address (or rank) $ADb_i$ of a bit $b_i$ of the source register Rs.

This instruction herein means, in a non-exhaustive way:

1) concatenating ("attaching") the bit $b_i$ to a binary word W1 contained in the register Rs with the most significant bit of a binary word W2 contained in the register Rd,
2) registering the word W3 which is the result of the concatenation in the register Rd.

The instruction is processed in four steps of reading 1.1, decoding 1.2, execution 1.3 and recording 1.4 of the type described further above, namely in two clock cycles H1 and only one pipeline cycle. During the decoding step 1.2, the decoder DEC1 sends addresses ADRs and ADRd to the bank SBANK, the address ADbi of the bit $b_i$ to the multiplexer MUX3, the code $CODE_{BMV}$ to the decoder DEC2 and the control signals SEL2, SEL4 to the multiplexers MUX2, MUX4. During the execution step 1.3 (register B3 activated), the output OUTRs of the bank SBANK is connected to the input of the multiplexer MUX3 whose output is connected to the input $e_{16}$ of the circuit BSHIFT. The binary word W1 contained in the register Rs is applied to the input of the multiplexer MUX3 and the binary word W2 contained in the register Rd is applied to the input IN1 of the unit ALU. Here, the unit ALU is transparent and copies the word W2 at its output OUT. The multiplexer MUX3 delivers a bit $b_{12}$ of the word W1 at the auxiliary input $e_{16}$. The circuit BSHIFT performs a rightward shift and delivers a binary word W3 of the following type:

$$W3 = b_{12}\ d_{15}\ d_{14}\ d_{13}\ d_{12}\ d_{11}\ d_{10}\ d_9\ d_8\ d_7\ d_6\ d_5\ d_4\ d_3\ d_2\ d_1$$

in which the most significant bit is the bit $b_{12}$ selected in the word W1. The other bits of the word W3 are the bits $d_{15}$ to $d_1$, of the word W2, the least significant bit $d_0$ having been eliminated from the result by the shift (this bit $d_0$ is then delivered as the flag C to the output OUTF of the circuit BSHIFT). The word W3 is registered in the register Rd during the last step 1.4.

To have a clear idea of the advantages of this instruction, Table 2 here below describes the following concatenation sequence:

"Concatenate in R0=1010 1010 1010 1010 (initial state)

the bit 12 of R1=0001̲0010 0011 0100, then the bit 0 of R2=0010 0011 0100 010̲1, then the bit 14 of R3=0̲011 0100 0101 0110, then the bit 2 of R1=0001 0010 0011 01̲00".

TABLE 2

| | | | | | | | R | E | G | I | S | T | E | R | | R | 0 | | | | | | | |
|---|---|---|---|---|---|---|---|---|---|---|---|---|---|---|---|---|---|---|---|---|---|---|---|---|
| Bits (rank) | | | | | | 15 | 14 | 13 | 12 | 11 | 10 | 9 | 8 | 7 | 6 | 5 | 4 | 3 | 2 | 1 | 0 | | | |
| Initial R0 | | | | | | 1 | 0 | 1 | 0 | 1 | 0 | 1 | 0 | 1 | 0 | 1 | 0 | 1 | 0 | 1 | 0 | | | |
| BMV R0, R1, 12 | | | | | 1 | 1 | 0 | 1 | 0 | 1 | 0 | 1 | 0 | 1 | 0 | 1 | 0 | 1 | 0 | 1 | | *0* | | | |
| BMV R0, R2, 0 | | | | 1 | 1 | 1 | 0 | 1 | 0 | 1 | 0 | 1 | 0 | 1 | 0 | 1 | 0 | 1 | 0 | | *1* | *0* | | |
| BMV R0, R3, 14 | | | 0 | 1 | 1 | 1 | 0 | 1 | 0 | 1 | 0 | 1 | 0 | 1 | 0 | 1 | 0 | 1 | | *0* | *1* | *0* | | |
| BMV R0, R1, 2 | 1 | 0 | 1 | 1 | | 1 | 0 | 1 | 0 | 1 | 0 | 1 | 0 | 1 | 0 | 1 | 0 | | *1* | *0* | *1* | *0* | | |

The concatenated bits in the register R0 are in bold characters. The bits in italics are the least significant bits lost by rightward shift. In all, the concatenation of the four bits necessitates only four pipeline clock cycles and one program of four instructions only.

It will clearly be seen by those skilled in the art that the present invention is open to numerous other alternative embodiments and improvements.

By way of an example, FIG. 2 shows a wire 20 connecting the decoder DEC2 to a fourth input of the multiplexer MUX2. This connection enables the decoder DEC2 to inject an 8-bit data element called an immediate data element into the input of the sector ST21, this immediate data element being extracted from an instruction read in the memory MEM.

By way of another exemplary variant, dashes in FIG. 2 are used to depict a multiplexer MUXS interposed between the output OUT of the unit ALU and the input of the circuit BSHIFT. This multiplexer has an input connected to the output OUTm of the memory MEM and enables the direct injection into the circuit BSHIFT of a data element stored in the memory.

Furthermore, it is clear that the circuit BSHIFT may be designed to work with rightward shifts as well as with leftward shifts.

Also, the arrangement of the registers B1 to B 4 shown in FIG. 2 is not imperative. The pipeline operation according to the invention can be obtained in various ways. For example, the register B3 can be eliminated if the decoder DEC1 itself synchronizes the transfer of the pieces of data (ADRs, ADRd, ADbi, $CODE_{OP}$) and control signals (SEL2, SEL4 ) to the sector ST21. In this case, the register B3 is implicitly contained in the decoder DEC1. Also, the register B1 in practice may be integrated into the unit MMU and the circuit IPC.

Furthermore, it is clear that certain elements of the microprocessor are optional. For example, the choice of a smaller memory receiving 16-bit addresses or a microprocessor working on 32 bits would make the unit MMU unnecessary.

Finally, it will be clearly be seen by those skilled in the art that the term "clock half-cycle" should not be interpreted in restrictively. Indeed, at constant operating speed, an equivalent approach would be to provide for a clock signal with double speed and to activate the pipeline sectors during only one in every two clock cycles, by offsetting the activation of each sector in relation to the following sector by one clock cycle. For each pipeline register B1 to B4, the selection of one out of every two clock bits as a control signal may be done simply by means of a frequency divider circuit, for example a D type flip-flop circuit whose /Q output is brought to the D input. The control signals of the pipeline registers may furthermore be combined into XOR gates before being applied, in order to ensure that two complementary sectors of one and the same pipeline stage will not be activated simultaneously.

In general, here above we have described a simplified microprocessor that includes only the elements needed for the description and the understanding of the essential aspects of the invention. It is within the scope of those skilled in the art to add various other elements to the microprocessor of the invention, especially the standard elements that work in the operation of the microprocessor such as circuits for the generation and processing of interruption signals, clock circuits, bus controller circuits, inputs/outputs, etc.

We claim:

1. A pipeline microprocessor comprising:

exactly two pipeline stages being defined by a first pipeline stage and a second pipeline stage, each of the pipeline stages including a first sector and a second sector, the first sector of the second pipeline stage being contiguous to the second sector of the first pipeline stage;

means for reading instructions and means for decoding instructions of a program recorded in a memory, the means for reading and the means for decoding instructions being laid out in the first pipeline stage of the exactly two pipeline stages;

a bank of registers that is laid out in a read mode in the first sector of the second pipeline stage of the exactly two pipeline stages and that is laid out in a write mode in the second sector of the second pipeline stage; and computation and data-processing means that are laid out in the first sector of the second pipeline stage, the first sector being activated only during a first half-cycle of a clock signal of the microprocessor and the second sector being activated only during a second clock half-cycle of the clock signal of the microprocessor.

2. The microprocessor according to claim 1, wherein the memory is laid out in the write mode in the second sector of the second pipeline stage.

3. The microprocessor according to claim 1, wherein the two sectors of the first pipeline stage are activated during complementary half-cycles of the clock signals the first sector of the first pipeline stage comprising the means for reading the instructions in the memory and the second sector of the first pipeline stage comprising the means for decoding the instructions.

4. The microprocessor according to claim 1, wherein the first sector of the second pipeline stage comprises an arithmetic and logic unit and a shift circuit.

5. The microprocessor according to claim 1, wherein the computation and processing means comprise means for the performance, in one clock half-cycle, of an operation to concatenate a bit of a first binary word with bits of a second binary word.

6. The microprocessor according to claims 1, wherein the means for reading and means for decoding instructions are arranged to decode compact instructions comprising an instruction code, an address of a first register and an address of a second register of the bank of registers.

* * * * *

UNITED STATES PATENT AND TRADEMARK OFFICE
CERTIFICATE OF CORRECTION

PATENT NO.    : 6,779,105 B1
DATED         : August 17, 2004
INVENTOR(S)   : Eric Bouyoux et al.

It is certified that error appears in the above-identified patent and that said Letters Patent is hereby corrected as shown below:

Title page,
Item [54], Title, should read -- TWO PIPLINE STAGE MICROPROCESSOR HAVING TWO SUB-STAGES PER STAGE WITH SUB-STAGES BEING ACTIVE ON ALTERNATE CLOCK HALF-CYCLES --;

Column 4,
Lines 54 and 56, "DEC0" should read -- DEC1 --.

Signed and Sealed this

Twenty-eighth Day of December, 2004

JON W. DUDAS
*Director of the United States Patent and Trademark Office*